US009239856B2

(12) United States Patent  
True

(10) Patent No.: US 9,239,856 B2  
(45) Date of Patent: Jan. 19, 2016

(54) METHODS, SYSTEMS, OR APPARATUSES, TO PROCESS, CREATE, OR TRANSMIT ONE OR MORE MESSAGES RELATING TO GOODS OR SERVICES

(75) Inventor: Sidney L. True, West Linn, OR (US)

(73) Assignee: Sidney True, Lake Oswego, OR (US)

( * ) Notice: Subject to any disclaimer, the term of this patent is extended or adjusted under 35 U.S.C. 154(b) by 0 days.

(21) Appl. No.: 12/887,485

(22) Filed: Sep. 21, 2010

(65) Prior Publication Data

US 2012/0072441 A1  Mar. 22, 2012

(51) Int. Cl.
*G06F 17/30* (2006.01)
*G06Q 10/10* (2012.01)
*G06Q 30/06* (2012.01)

(52) U.S. Cl.
CPC .... *G06F 17/30345* (2013.01); *G06F 17/30035* (2013.01); *G06F 17/30386* (2013.01); *G06Q 10/10* (2013.01); *G06Q 30/0611* (2013.01)

(58) Field of Classification Search
CPC .................. G06F 17/30035; G06F 17/30345; G06F 17/30386; G06F 17/30286; G06Q 10/10
USPC ....... 707/765, 769, 922, 26.1, 27.1; 705/26.1, 27.1
See application file for complete search history.

(56) References Cited

U.S. PATENT DOCUMENTS

| | | | | |
|---|---|---|---|---|
| 5,794,207 | A * | 8/1998 | Walker | G06Q 10/02 705/26.4 |
| 7,379,904 | B2 * | 5/2008 | Tischer | G06Q 30/06 455/403 |
| 7,970,417 | B2 * | 6/2011 | Chang | G06Q 30/0601 370/328 |
| 8,025,226 | B1 * | 9/2011 | Hopkins, III | B60R 25/00 235/384 |
| 8,820,638 | B1 * | 9/2014 | Cotter | G06Q 40/02 235/380 |
| 2002/0007324 | A1 * | 1/2002 | Centner | G06Q 30/02 705/80 |
| 2002/0019758 | A1 * | 2/2002 | Scarpelli | G06Q 10/06 705/26.2 |
| 2002/0023006 | A1 * | 2/2002 | Partos | G06Q 30/02 705/26.44 |
| 2003/0154132 | A1 * | 8/2003 | Ogawa | G06Q 30/02 705/16 |
| 2004/0128369 | A1 * | 7/2004 | Moreau | H04L 29/06 709/220 |
| 2004/0151192 | A1 * | 8/2004 | Trossen | H04M 7/0003 370/401 |
| 2005/0164721 | A1 * | 7/2005 | Eric Yeh | H04L 12/5835 455/466 |
| 2007/0276948 | A1 * | 11/2007 | Burdett | H04L 67/34 709/228 |
| 2008/0040233 | A1 * | 2/2008 | Wildman | G06Q 30/0635 705/26.81 |
| 2009/0156184 | A1 * | 6/2009 | Chang | G06Q 30/0601 455/414.2 |

* cited by examiner

*Primary Examiner* — Phong Nguyen
(74) *Attorney, Agent, or Firm* — Berkeley Law & Technology Group, LLP

(57) ABSTRACT

Embodiments of methods, systems, or apparatuses relating to data processing and more particularly to methods, systems, or apparatuses to process, create, or transmit, one or more messages relating to goods or services.

22 Claims, 6 Drawing Sheets

METHODS, SYSTEMS, OR APPARATUSES, TO PROCESS, CREATE, OR TRANSMIT ONE OR MORE MESSAGES RELATING TO GOODS OR SERVICES

BACKGROUND

1. Field

The subject matter disclosed herein relates to data processing and more particularly to methods, systems, or apparatuses to process, create, or transmit one or more messages relating to goods or services.

2. Information

Utilizing one or more computing platforms, users may search for goods or services providers, or attempt to communicate with one or more goods or services providers, in many different ways. For example, in an Internet context, such as on the World Wide Web, a user may interact with a web browser, or one or more other applications or programs having similar or the same capabilities, in an attempt to identify or communicate with one or more goods or services providers. Similarly, a user may attempt to search for one or more goods or services providers using other types of search applications, such as mobile applications, desktop applications, directory applications, or the like. Likewise, a user may attempt to communicate with one or more goods or services providers identified by a user's search using one or more communication environments associated with one or more goods or services providers. For example, a user may attempt to communicate with one or more goods or services providers by utilizing one or more communication environments associated with one or more goods or services providers, such as email, SMS messaging, telephonic communication, or the like, as non-limiting examples. With so much information relating to goods or services providers reposed in digital form, there may be a desire to provide useful techniques for searching for, identifying, or communicating with, one or more goods or services providers in a more efficient or cost effective manner.

BRIEF DESCRIPTION OF DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description with the accompanying drawings in which:

DETAILED DESCRIPTION

Figure 1:
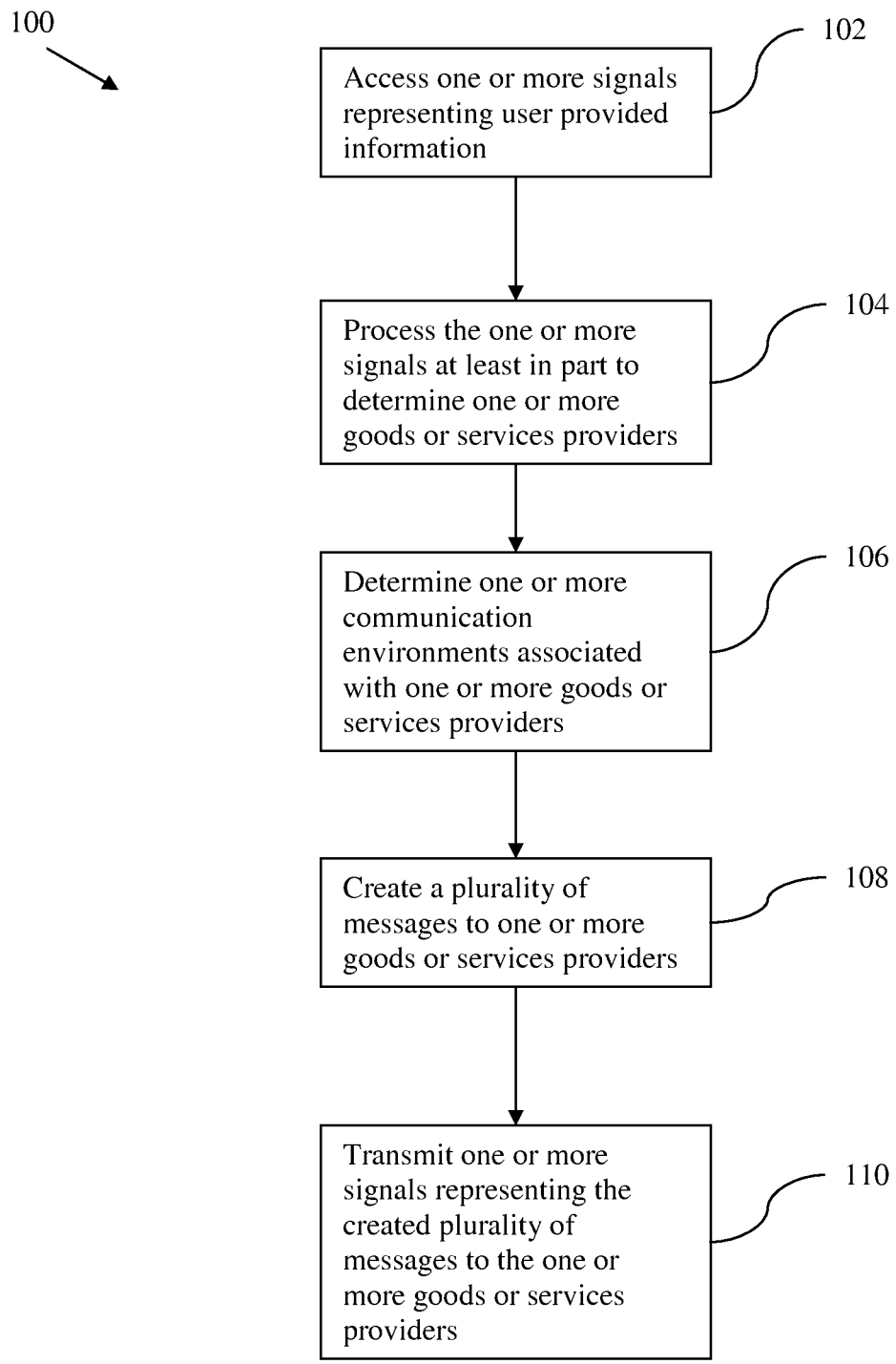
FIG. 1 is a flow chart depicting an example method to transmit one or more signals representing one or more created messages to one or more goods or services providers in accordance with an embodiment.

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some portions of the detailed description which follow are presented in terms of algorithms or symbolic representations of operations on signals, such as binary digital signals, which may be stored within a memory of a specific apparatus or special purpose computing device or platform. In the context of this particular specification, the term specific apparatus, specific computing platform, computing platform, or the like, includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like, refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

The terms, "and," and "or" as used herein may include a variety of meanings that will depend at least in part upon the context in which it is used. The term, "or" for example, may be used in an inclusive or exclusive sense. For example, if used to associate a list, such as A, B or C, "or" may mean A, B, and C, here used in the inclusive sense, as well as A, B or C, here used in the exclusive sense. In addition, if used to associate a list, "or" may include combinations of one or more of the listed items or elements.

Reference throughout this specification to "one embodiment" or "an embodiment" or a "certain embodiment" means that a particular feature, structure, or characteristic described in connection with the embodiment is included in at least one embodiment of claimed subject matter. Thus, the appearances of the phrase "in one embodiment" or "an embodiment", or a "certain embodiment" in various places throughout this specification are not necessarily all referring to the same embodiment. Furthermore, the particular features, structures, or characteristics may be combined in one or more embodiments. Embodiments described herein may include machines, devices, engines, or apparatuses, as non-limiting examples, that operate using digital signals. Such signals may comprise electronic signals, optical signals, electromagnetic signals, or any form of energy that provides information between locations, as non-limiting examples.

In this context, goods or services may mean one or more physical goods, such as tangible objects, that may be purchased, sold, leased, rented or otherwise transferred between one or more parties, or one or more services, such as the performance of any tasks or work, by one party on behalf of or for another party, as just an example. Similarly, goods or services providers may mean one or more individuals, or other legal entities, that may provide goods or services to others, for example. Goods or services providers, in this context, may comprise providers of help, assistance, utilities or commodities, products, accommodations, activities, maintenance, repair, parts, manufacture of goods, communications, transportation, employment in any duties or work for a person, organization, government, or the like, etc. In this example, goods or services providers may comprises entities providing goods or services to others, such as an educational institution, business, non-profit organization, etc., and a user may, under some circumstances, be making an inquiry for one or more reasons other than to purchase goods or services from such goods or services provider. For example, a user may wish to contact multiple educational institutions for the purpose of attending one of such institutions or for another purpose, such as seeking employment at one of such institutions. It should, however, be noted that these are merely examples relating to goods and services providers and that claimed subject matter is not limited in this regard.

As mentioned previously, there may be a desire to provide useful techniques for searching for, identifying, or communicating with, one or more goods or services providers in a more efficient or cost effective manner. For example, a user may interact with a search application, or other like application program or user interface, to provide one or more portions of user information to a search field, or the like, in an attempt to identify information which may relate to one or more goods or services that a user may desire. Here, such user provided information may be provided to a process or application, such as a search engine, for example, for processing. The search engine may then conduct a search (or possibly invoke other processes or applications to perform a search) to establish a set of "search results".

In this context, the phrase "search results" refers to information that may be provided, at least in part, to a user's computing platform and which may be processed, or otherwise presented in some manner, to a user. For example, in certain implementations, search results may be processed to present a user with one or more selectable links (e.g., hyperlinks) associated with information, such as information associated with one or more goods or services providers which may be identified, determined, or located, at least in part, by one or more search applications. Such search results may include a summary or snippet comprising information associated with one or more goods or services providers, an image, or other content from a web page, or other like available documents or data files. In addition, such search results may comprise information useful for creating or transmitting a message to one or more goods or services providers associated, at least in part, with such search results, as just an example.

To illustrate some of the above, as just an example, suppose a user may be searching for a particular goods and services provider, such as an accountant, using a web-based search application. A user may input, or a program or application may otherwise access, one or more portions of user provided information relating to a user's request to identify one or more accountants. As just an example, a user may input the term "accountant" into a search field associated with a web-based search application. In response, a set of search results which may relate to one or more accountants may be presented to the user on the user's computing platform. As just an example, such search results may be displayed as hyperlinks to one or more documents, files, websites, etc., which relate to one or more accountants. A user may then access, such as by clicking on, one or more such hyperlinks, in an effort to obtain information relating to one or more accountants associated with a particular hyperlink.

Under some circumstances, such an approach may be time consuming or inefficient for a user. In other words, a user may spend time searching through a number of links to determine information they may desire. Likewise, a user may desire to transmit a message, such as a user's request for accounting services, to one or more accountants associated with a user's search. Here, however, in this environment, it may be time consuming for a user to transmit a message to one or more accountants.

In addition, under some circumstances, such an approach may subject a user's computing platform to pernicious programs, such as malware, spyware, or adware, as just some examples, or expose user information which the user may regard as private, such as information stored or accessible via a user's computing platform, to sources in which a user may not find desirable. With these and other circumstances in mind, in accordance with certain aspects of the present description, some example implementations are presented which may include methods, systems, or apparatuses to process, create, or transmit one or more messages relating to goods or services.

FIG. 1 is a flow chart 100 depicting an example method to transmit one or more signals representing one or more created messages to one or more goods or services providers, in accordance with an embodiment. With regard to box 102, a system or apparatus, such as one or more computing platforms, may access one or more signals representing user provided information.

In this example, user provided information may mean one or more pieces of information provided by, or otherwise accessible to, one or more computing platforms that at least in part relate to a user, such as information provided by a user, information provided by one or more software programs associated with a user, information relating to a user assessable by one or more computing platforms, or combinations thereof, as non-limiting examples. For example, user provided information may comprise user account information, such as login information, geographic information, preference information, contact information, any other information that may be associated with a user account, or combinations thereof. Likewise, user provided information may comprise search history of a user, such as one or more cookies associated with a user, or one or more search terms, such as one or more key words, which may have been entered by a user into an application program, such as a web browser or a web page. In addition, user provided information may comprise one or more user inputs, such as a user's selection or interaction with one or more links, buttons, or the like, such as within a web page or an application program, as just an example, or one or more text narratives provided by a user, such as with an application program or interface, as discussed above. As mentioned previously, in certain embodiments, user provided information may be accessible to a computing platform through one or more application programs, or the like, running within an application program or web browser, such as a Flash Interface, a CGI interface, or the like, such as an IP address associated with a user's computing platform, information relating to an operating system, web browser, or other application program associated with a user's computing platform. It should, however, be noted that these are merely illustrative examples relating to user provided information and that the scope of claimed subject matter is not limited in this regard.

In this context, an application program, a user interface, one or more operating systems, or like processes or operations, may convert one or more portions of user provided information into one or more signals, such as binary digital signals. Such binary digital signals may, under some circumstances, be manipulated, transmitted, received, stored, accessed, or the like. For example, a client application program may transmit one or more signals representing at least a portion of the user provided information to one or more computing platforms, such as to one or more servers, or the like, as a non-limiting example.

With regard to box 104, one or more computing platforms may process the one or more signals, such as one or more signals representing one or more portions of user provider information described above, at least in part to determine one or more goods or services providers. For example, a computing platform may process the one or more signals representing at least a portion of user provided information to determine one or more goods and services providers, at least in part by using one or more language processing techniques, key word processing techniques, stored user preferences, or other like processes or operations, to determine at least some information relating to one or more goods and services providers. It should be noted that there may be numerous techniques which may be utilized to determine one or more goods or services based, at least in part, on one or more portions of user provided information. The below examples are illustrative of merely a few of these techniques and, accordingly, the scope of claimed subject matter is not limited in this regard.

Suppose for sake of illustration, that at least a portion of user provided information comprises one or more user selections of one or more categories of goods or services providers, such as a user selection from a drop down menu, one or more autosuggest options, or the like, provided via a web page, a search application, or the like. Here, in this context, one or more options from such a drop down menu or autosuggest options may be at least in part associated with one or more particular goods or services providers. For example, under certain circumstances, one or more goods or services providers may be indexed in a database such that they may be associated with one or more particular categories of goods or services. Accordingly, one or more goods or services providers may be determined based, at least in part, on such user provided information.

For further illustration, suppose signals relating to user provided information may comprise one or more search terms (e.g., key words) or textual narratives provided by the user via a search program or application program, such as a web browser or the like. In this example, one or more language processing techniques, such as parsing, concatenating, natural language processing techniques, key word processing techniques, or the like, may be used to determine one or more goods or services providers at least in part relating to such user provided information.

For example, in certain embodiments, the use of one or more language process techniques may be useful to perform various types of comparison or matching (e.g., similarity or dissimilarity comparison) on the user provided information, such as exact matching, inexact matching, one or more other matching or comparison techniques, or the like, at least in part to determine one or more goods or services providers relating to such user provided information. For example, matching or comparison may be performed in conjunction with one or more stored indexes of goods or services provider information. For example, goods or services provider information may be indexed, such as by categories, geographic region, specific types of goods, specific types of services, goods or services descriptions, key words relating to type of goods or service, etc. In this example, such indexed information corresponding to goods or services providers may be matched or compared, at least in part, to determine one or more goods or services providers that may relate, at least in part, to user provided information.

As a simple example, suppose a user may be searching for, or attempting to communicate with, one or more accountants, as in the example above. Suppose a user may enter the phrase "I need an accountant to do my taxes before April 15", such as into an online or offline search application. Here, a language processing program may be used to examine this phase and determine, based at least in part on this information, that this user may be looking for one or more accountants. As just an example, a language processing program may analyze this phrase, extract certain terms, such as "accountant", and compare such terms with information relating to one or more goods or services providers in an index, as just an example.

In certain embodiments, at least some information relating to goods or services providers may not be indexed. Under these circumstances, it may be desirable for certain operations or programs to determine such information for one or more of such goods or services providers which may not be indexed. For example, a computing platform may, in conjunction with one or more application programs, such as one or more search engine applications, determine one or more goods or services providers at least in part by executing one or more searches based at least in part on the processed signals representing the user provided information.

For example, one or more search applications may perform one or more searches based on such user provided information to determine potential goods or services providers, such as by performing one or more searches of one or more goods or services providers at least partially accessible via the World Wide Web or other computer networks, as just an example.

As an example, one or more computing platforms may process one or more signals representing at least a portion of user provided information to determine that a user is searching for one or more goods or services. In this example, the one or more computing platforms may determine one or more potential goods and services providers based at least in part on the processed signals, such as one or more determined types of goods or services, a user's determined geographic locations, one or more user preferences, other determined aspects of the user provided information, or combinations thereof.

In another example, a user may be looking for one or more goods or services providers, such as one or more accountants. In this example, no, or few accountants may have been previously indexed, or stored, in a computing platform. For example, a computing platform may search for one or more goods or services providers based at least in part on one or more portions of user provided information, such as the term accountant provided in a textual narrative field. In this example, the computing platform may not have sufficient stored entries for accountants, and accordingly, it may be desirable for the computing platform to identify one or more additional accountants. For example, the computing platform may extract the term accountant from a textual narrative field and transmit one or more signals representing that term, alone or in combination with one or more other terms, to one or more search engines at least in part to identify one or more additional accountants. In addition, such a computing platform may filter any results from the search engine based at least in part on one or more additional portions of user provided information, such as geographic location, user preferences, or the like. In this example, information relating to the one or more of the additional goods and services providers may be transmitted to a computing platform, such as for display to a user in accordance with an embodiment. It should, however, be noted that these are merely illustrative examples relating to goods and services providers and that claimed subject matter is not limited in this regard.

In at least one embodiment, a computing platform may employ any combination of user provided information to at least in part determine one or more goods or services providers in response to a user query. For example, if a user executes a query looking for one or more accountants, a computing platform may potentially determine a large number of accountants for potential display to such as user. For example, the computing platform may employ geographic information relating to the user, such as GPS information from a mobile phone, zip code information from user account information, IP address information, such as provided by a web browser, application program, or the like, or any other user provided information that may be useful for narrowing or refining results for a search of potential goods and services providers. Though, again, these are merely illustrative examples relating to user provided information and claimed subject matter is not limited in this regard.

Furthermore, one or more portions of information relating to at least some of such determined goods or providers may be provided to a computing platform associated with a user, such as for display to the user along with one or more other search results. It should, however, be noted that these are merely illustrative examples relating to user provided information or goods or services providers and that claimed subject matter is not limited in this regard.

With regard to box 106, one or more computing platforms may determine one or more communication environments associated with one or more goods or services providers. For example, the one or more computing platforms may analyze information relating to one or more determined goods and services providers described above with regard to box 104. In this example, the one or more computing platforms may look up a particular goods and services provider, such as in a database, via one or more networks, such as the world wide web, or the like, at least in part to determine one or more communication environments, such as telephone number, cell phone number, text message information, short message service information, web page information, e-mail information, other such communication information, or combinations thereof.

As used herein, a communication environment may mean one or more types or formats of communication capable of being delivered or received through one or more physical or logical layers of communication. For example, a communication environment may comprise an e-mail communication delivered or received via a one or more networks, one or more network protocols, one or more mediums of communication, or combinations thereof; a phone message delivered via one or more telephone networks, one or more other networks, such as a voice over internet protocol network or network protocol, one or more communication mediums, telecommunication protocols, or combinations thereof; short messages, such as text messages, multimedia messages, SMS messages, or the like, delivered via one or more networks, one or more communication mediums, one or more network communication protocols, or combinations thereof. Of course, it should, however, be noted that these are merely illustrative examples relating to communication environments and that the scope of claimed subject matter is not limited in this regard.

In at least one embodiment, one or more communication environments may be determined for one or more goods or services providers where such communication environments or communication environments have not been previously indexed or stored. For example, one or more application programs may search for or identify information associated with one or more goods or services providers at least in part to determine one or more communication environments for such goods or services providers. For example, an application program may attempt to determine a communication environment for a goods or services provider by analyzing one or more documents or files associated with such a goods or services providers. In this example, such an application program may analyze one or more mark up languages, such as HTML, XML, etc., of a web pages associated with a goods or services provider to find indicia of a communication environment, such as parentheses around an area code in a phone number, a particular quantity of numbers arranged in a particular format, @ symbols in one or more e-mail addresses, hyperlinks associated with one or more e-mail clients, particular portions of text associated with communication, such as contact us, or the like at least in part to determine one or more communication environments associated with such a goods or services provider. It should, however, be noted that these are merely illustrative examples relating to one or more communication environments and that claimed subject matter is not limited in this regard.

With regard to box 108, one or more computing platforms may create, one or more messages to one or more goods or services providers, a plurality of messages to one or more goods or services providers, or combinations thereof. As used herein, create may mean at least in part to cause to happen, form, bring about, arrange, such as by intention or design, one or more messages. For example, a computing platform may create one or more messages at least in part by interacting with one or more electronic signals to at least in part cause such signals to represent one or more messages, wherein such messages may, under some circumstances, be transmitted, at least in part, via one or more communication environments.

For example, the one or more computing platforms may create a plurality of messages to a single goods and services provider employing a plurality of communication environments, a plurality of messages to a plurality of goods and services providers employing one or more communication environments, one or more messages to one or more goods and services providers employing one or more communication environments, or combinations thereof. By way of example, the one or more computing platforms may create a text message using one or more protocols, such as SMS, an e-mail using one or more protocols, one or more application program interfaces, or combinations thereof, a voice message, such as by using one or more text to speech application programs, or the like, or combinations thereof. In addition, the one or more messages may comprise information relating to, or derived from, one or more portions of the user provided information. For example, the created messages may comprise one or more portions of a user textual narrative, one or more user preferences, information relating to a user account, or the like. In this context, any portions of user provided information, or other information, may be reformatted based at least in part on a determined communication environment. For example, the information in a message may be reformatted such that the information may be appropriately transmitted via the determined communication environment. For example, if the determined communication environment comprises a voice mail message, such information may be processed by a text-to-voice application program for transmission to a particular goods or services provider's voice mail. Likewise, if the determined communication environment comprises an SMS message system, the information may be reformatted into an appropriate text format an of an appropriate character length for such an SMS message system. For example, the information may be shortened to fit in a single message, or may be separated into several messages of an appropriate size for such an SMS message system. Also, when a message is created, various things may be added or omitted. Furthermore, the created messages may include one or more graphics, one or more portions of user information, such as previous search or purchase history, user price sensitivity, user deadline expectations, etc. In addition, such a created message may include a hyperlink or the like to a web based interface for a goods or services providers to provide a response to a user goods or services inquiry, such as in a system where the contact information for the user may be obfuscated from such goods or services providers. It should, however, be noted that these are merely illustrative examples relating to creating messages and the claimed subject matter is not limited to such examples.

With regard to box 110, the one or more computing platforms may transmit one or more signals representing the created plurality of messages to the one or more goods or services providers. In this example, the created messages may be transmitted or sent to one or more goods or services provides, such as via the one or more of the determined communication environments. For further example, the one or more created messages may be transmitted via one or more of the determined communication environments. Furthermore, the created messages may be transmitted to one or more goods or services providers based on a variety of factors, such as one or more financial relationships with the one or more goods or services providers. For example, some goods or services providers may receive the created messages before other goods or services providers based on a variety of factors. It should, however, be noted that these are merely illustrative examples relating to created messages and that claimed subject matter is not limited in this regard.

Figure 2:
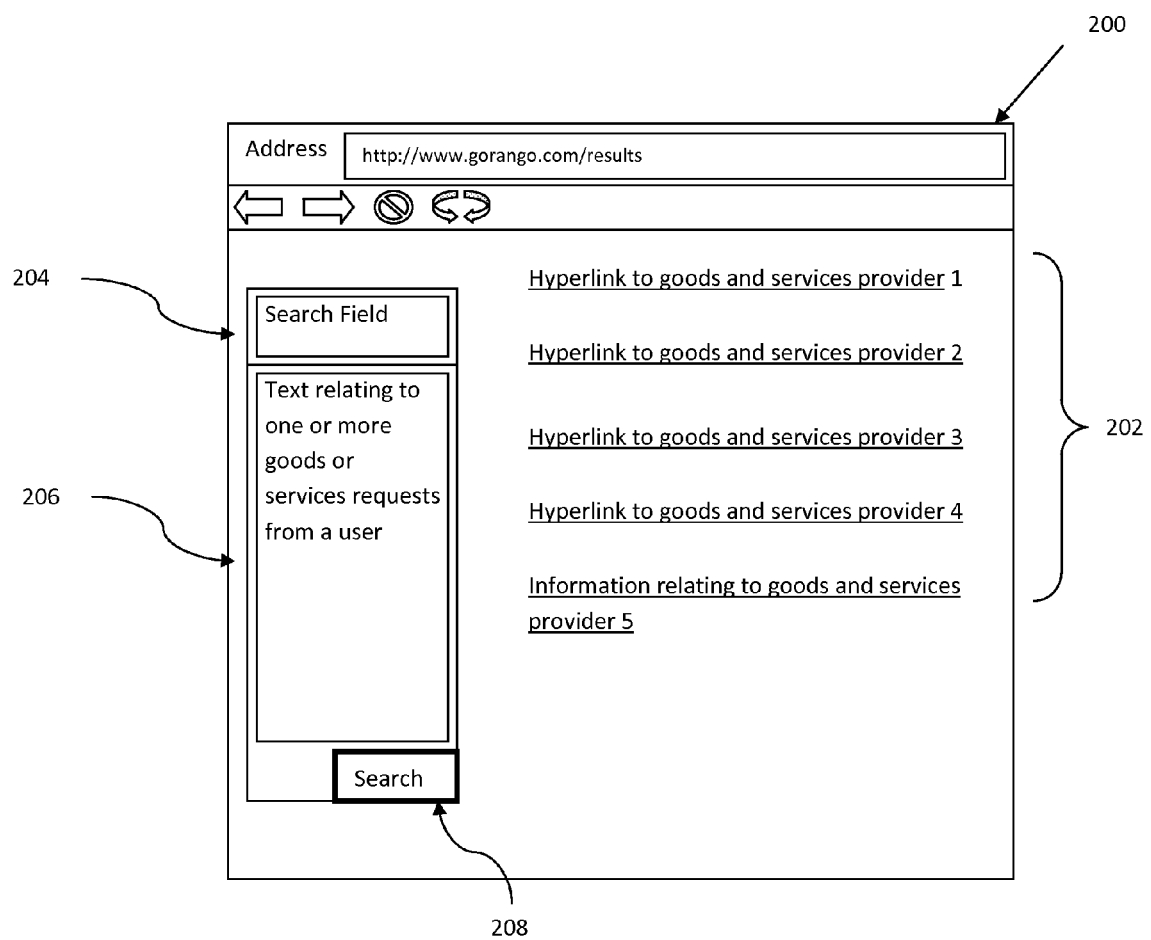
FIG. 2 is a schematic diagram illustrating an example of an user interactive display in accordance with an embodiment.

FIG. 2 may serve as a helpful illustration. FIG. 2 depicts a schematic diagram of an example user interface at least in part for determining one or more goods or services providers, receiving one or more portions of user provided information, creating one or more messages to the determined one or more goods or services providers, transmit signals representing the created one or more messages, or combinations thereof. With regard to FIG. 2, a user interface depicts an application program, such as a web browser application program. In this example, such a web page may display a portion of a web page associated with a search engine or other similar service. For example, user interface 200 may include one or more search results, such as search results 202. In this example, search results 202 may comprise hyperlinks, or other network accessible information relating to one or more goods or services providers, such as goods and services provider 1, goods and services provider 2, goods and services provider 3, or goods and services provide 4. Further, search results 202 may also comprise information relating to the one or more goods or services providers, such as one or more ratings, contact information, goods or services descriptions, etc. In addition, in certain embodiments, 202 may include boxes or some selection means where users can select certain GSP. Though, it should be noted that these are merely illustrative examples relating to a user interface and claimed subject matter is not limited in this regard.

In this example, user interface 200 may further comprise one or more areas at least in part for receiving user information relating at least in part to one or more goods or services providers. For example, user interface 200 may further comprise a search field 204 operable to receive one or more user search terms, or user selected search categories, user narratives, such as a user textual narrative, one or more key words, or the like. In this example, search field 204 may comprise one or more interfaces for receiving one or more portions of user information, such as a CGI, FLASH, other such interface, or combinations thereof. In this example, a user may input a textual narrative, such as by using one or more user input devices associated with a computing platform, such as a keyboard, a mouse, a microphone, other input device, or combinations thereof. User interface 200 may further include one or more portions of information relating to a user goods or services request, such as field 206. In this example, field 206 may comprise one or more interfaces for receiving one or more portions of user information, such as a CGI, FLASH, other such interface, or combinations thereof. Furthermore, in this example field 206 may comprise text, such as one or more further textual narratives, describing a type of goods and services a user is searching for, has searched for previously, suggested goods or services, or combinations thereof. For example, field 206 may comprise a field for receiving user information related to a goods or services request, such as a type of goods or type of services. In this example, box 204 may comprise a field for receiving user information, such as a user textual narrative describing one or more details relating to a goods or services request. For example, a user may input a textual narrative describing a home improvement project into field 204. For further example, a user may input textual information relating to a goods or services request, such as a general contractor or the like, into field 206. Referring again to FIG. 2, user interface 200 may further comprise an at least in part user selectable object 208, such as a button or the like. In this example object 208 may be selectable by a user, such as by using an input device associated with a computing platform, at least in part to initiate a search for one or more goods or services providers, refine a search for one or more goods or services providers, create one or more message to one or more goods or services providers, transmit signals representing one or more of the created one or more messages, or combinations thereof. Though, it should be noted that these are merely illustrative examples relating to a user interface and claimed subject matter is not limited in this regard.

In certain search engines, or search engine application programs, or other like searching tools, for example, a user may be provided with certain automated techniques that may assist the user in refining or focusing an existing search. For example, some search engines or the like may allow a user to further refine an existing set of search results, for example, based on further terms, additional user provided information, such as one or more textual narratives, or other like information. Here, for example, an additional search term or other like criteria may be added to selectively parse through or otherwise reduce an existing set of search results. Similarly, for example, some search engines dynamically suggest search terms as the user enters particular search terms. Some search engines, for example, present further search query terms that may be related and which upon selection of the hyperlink or other like feature initiate a search with the suggested related search term(s). Though, of course, these are merely illustrative examples relating to an application program and claimed subject matter is not limited in these regards.

In yet another example, a user may provide one or more portions of user provided information, such as by typing a textual narrative in field 206. In this example, a user may further initiate a search such as by clicking on button 208. Furthermore, in this example, one or more portions of the provided textual narrative may be transmitted via one or more communication channels to one or more goods or services providers. In this example, a list of search results, such as search results 202 may not be transmitted to the user's computing platform. In this example, the one or more goods or services providers may transmit a response, directly or through one or more third party applications or computing platforms to the user. For example, the user may receive one or more e-mails, phone calls, voicemails, or text messages from one or more goods or services providers without having received or interacted with search results relating to the goods or services providers. Though, of course, this is merely an illustrative example and claimed subject matter is not limited in this regard.

As a more detailed example, suppose at least a portion of user provided information comprises a textual narrative typed into field 206, such as "I need a civil engineer to review construction plans on a drainage ditch." In this example, the user may additionally click on button 208, such as to start a search for goods and services providers. In this example, based on the above-identified user provided information, an apparatus or system, such as one or more computing platforms, may determine one or more potential goods or services providers, such as one or more civil engineers or the like. In addition, the apparatus or system may also determine contact information for the one or more potential goods or services providers, create one or more messages, and transmit the created one or more messages to one or more of the potential goods or services providers. Thus, as just an example, a particular goods or services provider may receive a message stating "I need a civil engineer to review construction plans on a drainage ditch" (or other messages or notifications) via his or her e-mail, cell phone, text message, or via one or more other communication environments, as just an example.

In this example, one or more goods or services providers that received one or more of the created messages may respond to one or more of those received messages, such as by replying to the e-mail or replying to the text message, and that reply message (or other messages or notifications) may be transmitted to the user via his or her email, cell phone or via one or more other communication environments, as just an example. In another embodiment, the responses may be transmitted to one or more computing platforms for further processing prior to being transmitted to the user. Thus, in this example a user may receive one or more messages from one or more goods or services providers in response to submitting the above phrase relating to the goods or services desired by the user. Though, again, these are merely illustrative examples relating to search for goods or services providers and claimed subject matter is not limited in this regard.

Figure 3:
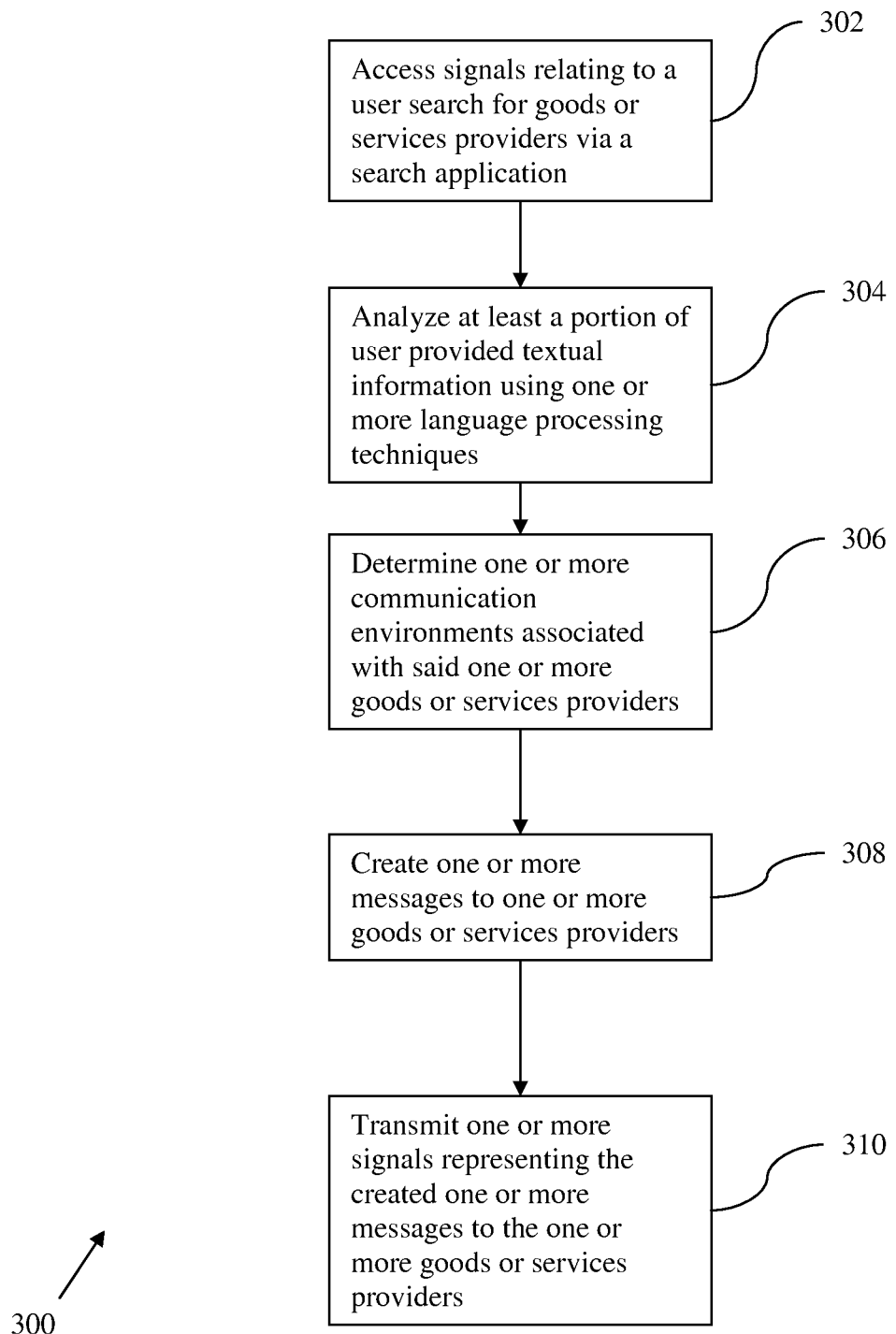
FIG. 3 is a flow chart depicting another example method to transmit one or more signals representing one or more created messages to one or more goods or services providers in accordance with an embodiment.

FIG. 3 is a flow chart 300 depicting another example method to transmit one or more signals representing one or more created messages to one or more goods or services providers in accordance with an embodiment. At box 302, a system or apparatus, such as one or more computing platforms, may access one or more signals relating to a user search for goods or services providers via a search application, application program, application program interface, or combinations thereof. In this example, such signals may represent one or more portions of user provided information such as one or more search terms, a textual narrative, a selection of one or more categories, other user provided information, or combinations thereof. Referring to box 304, such computing platforms may analyze at least a portion of the user provided information, such as a user provided textual narrative at least in part by employing one or more language processing techniques. In this example, a computing platform may execute one or more natural language processing techniques, one or more key word processing techniques, or the like, to determine an approximate content of a user textual narrative. In this example, such language processing techniques may comprise one or more key word processing techniques, one or more Boolean search or query processing techniques, one or more natural language processing techniques, one or more other language processing techniques, or combinations thereof. For example, such language processing techniques may comprise one or more natural language processing techniques, such as GATE (General Architecture for Text Engineering), MontyLingua, etc. In at least one embodiment, such language processing techniques may be used to identify one or more key words in a user provided textual narrative. For example, such natural language processing techniques may be used to identify one or more key words that at least in part correspond to stored, indexed, or network accessible information relating to one or more goods or services providers, such as one or more categories of goods or services providers. In this example, such one or more key words may correspond to one or more noun phrases, one or more preselected or dynamically determined categories of goods or service providers, etc. Furthermore, such key words may be matched or compared to information relating to one or more goods or services providers, such as described previously. In yet another embodiment, such language processing techniques may produce results other than one or more key words, and, accordingly, other techniques for matching or comparison of such language processing results to one or more goods or services providers may be used. Though, it should be note that these are merely illustrative examples relating to user provided information and claimed subject matter is not limited in these regards.

With regard to box 306, one or more application programs, one or more computing platforms, or combinations thereof may determine one or more communication environments associated with one or more determined or identified goods or services providers. For example, an application program executing on a computing platform may determine a communication environment associated with a goods or services providers at least in part by searching a database, network storage location, or other storage device or location for a stored communication environment associated with a goods or services provider. In this example, one or more communication environments may have previously been associated with a particular goods or services provider and such associating may have been stored in one or more physical or logical storage devices or structures. For further example, an application program executing on a computing platform may determine a communication environment associated with a goods or services providers at least in part by searching one or more network locations associated with a goods or services provider, such as a web page, or otherwise hyperlinked collection of information associated with a goods or services provider. In this example, the application program may access a web page associated with a goods or services provider at least in part to determine or associate a communication environment with the goods or services provider. Such an application program may analyze one or more aspects of a web page to identify phone numbers, e-mail addresses, short message contact information, other contact information, or combinations thereof to associate with such goods or services providers. Though, it should be noted that these are merely illustrative examples relating to determining a communication environment and claimed subject matter is not limited in these regards.

With regard to box 308, one or more application programs, application program interfaces, computing platforms, or combinations thereof, may create one or more messages to one or more goods or services providers based at least in part on the determined one or more communication environments associated the one or more goods or services providers. In this example, after a user has input such user provided information, that user may or may not be displayed a set of one or more goods or services providers relating to such user provided information. For example, in one embodiment a user's computing platform may receive one or more signals representing one or more goods or services providers, and such one or more goods or services providers may be displayed to the user. In another example embodiment, a user may not receive such signals. In this example, the user may merely receive a message that one or more goods or services providers may have been contacted via one or more messages without any further interaction on the part of the user. In an embodiment, an application program in connection a computing platform may create one or more messages to one or more goods or services providers, such messages being compatible with one or more communication environments. By way of example, such application programs or computing platforms may create a first message to a first goods or services provider having a first communication environment, such as an e-mail, a second message to the first goods or services provider or a second goods or services provider having a second communication environment, such as a multimedia message. Such multimedia message may include text, audio, video, or combinations thereof at least in part comprising one or more portions of user provided information. For example, such a message may comprise a textual indication of a user input, such as a category of goods or services providers along with an audio or video indication of a user input, such as a recording of a user textual narrative, or an audio file created based at least in part on a user textual narrative, such an audio file created using one or more text to speech application programs. Though, of course, it should be noted that these are merely illustrative examples relating to creating one or more messages and that claimed subject matter is not limited in this regard.

With regard to box 310, one or more application programs, one or more application program interfaces, one or more computing platforms, or combinations thereof may transmit one or more signals representing the created one or more messages to the one or more goods or services providers. For example, such application programs, application program interfaces, computing platforms, or combination thereof may form one or more signals corresponding to the created messages. Furthermore, such signals may be formatted, adapted, modified, etc. at least in part to conform with one of the one or more determined communication environments, such that those signals may be transmitted vie the determined communication environment. For example, the application program may create a text message, e-mail message, voice mail message, etc. and transmit the created message via an appropriate communication environment or in a format appropriate for a particular communication environment to the determined one or more goods or services providers. It should, however, be noted that these are merely illustrative examples relating to transmitting messages and that claimed subject matter is not limited in this regard.

Figure 4:
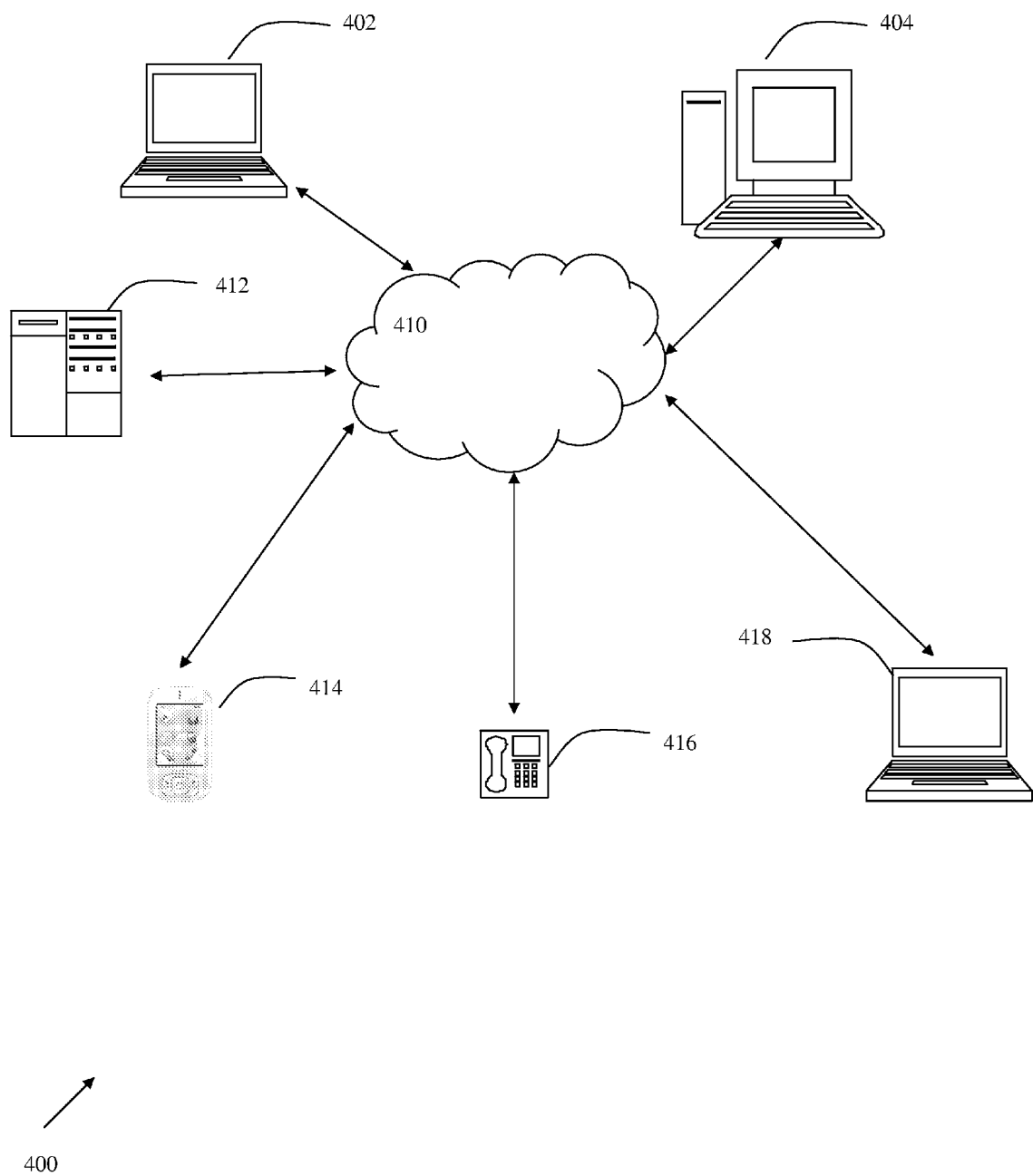
FIG. 4 is a schematic diagram illustrating an example of one or more computing platforms communicating in accordance with an embodiment.

FIG. 4. is a schematic diagram depicting an embodiment of a system for use in searching for goods or services providers, determining communication environments, creating message, transmitting message, or combinations thereof, in accordance with an embodiment. In system 400, one or more computing platforms such as computing platforms 402 or 404 may be communicatively coupled to network 410. In this example, computing platform 402 and 404, though depicted as particular types of computing platforms, are in no way limited to the computing platforms depicted and may take a variety of other forms. Here, in this example, computing platform 402 or 404 may be a computing platform associated with one or more users, such as a client device, application program, application program interface, or combination thereof, which may be utilized to communicatively couple to network 410. Thus, for example, a user may input a search query or access one or more buttons, hyperlinks or icons associated with one or more goods or services providers, one or more inputs for user provided information, one or more portions of user provided information, or combinations thereof that may be transmitted via computing platforms 402 or 404 and network 410 to computing platform 412, as just an example. Though depicted as a single computing platform, computing platform 412 may comprise one or more computing platforms, such as one or more search engines, one or more web servers, one or more databases, one or more message creating computing platforms, one or more computing platforms having one or more other functional roles, or combinations thereof. In this example, computing platform 412 may be operable to identify one or more goods or services providers, determine one or more communication environments for one or more goods or services providers, receiving one or more portions of user provided information, create one or more messages to one or more goods or services providers, transmit the created one or more messages via one or more determined communication environments, or combinations thereof. For example, computing platform 412 may receive via network 410 one or more signals representing one or more portions of user provided information. Computing platform 412 may be further operable to identify one or more goods or services providers, determine one or more communication environments associated with such goods or services providers, or combination thereof. Computing platform 412 may be further operable to create one or more messages based at least in part on one or more portions of user provided information, the identified one or more goods or services providers, the determined one or more communication environments, or combinations thereof. Computing platform 412 may be further operable to transmit one or more signals representing the created one or more messages via network 410 to one or more communication devices associated with one or more goods or services providers, such as a cellular telephone 414, a land line telephone 416, a computing platform 418, or combinations thereof. It should, however, be noted that these are merely illustrative examples relating to a system and that claimed subject matter is not limited in this regard.

Figure 5:
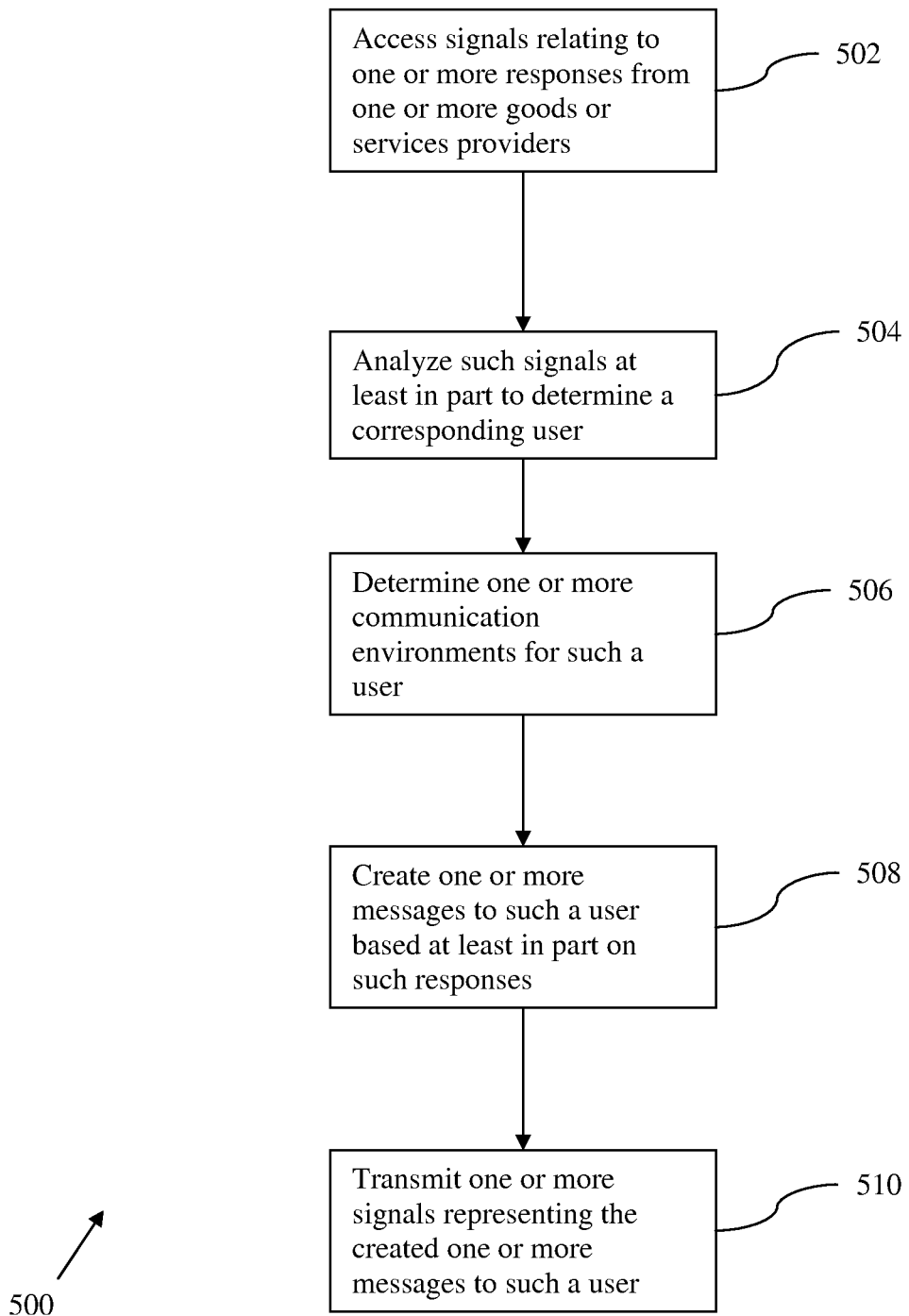
FIG. 5 depicts a flow chart of a process of one or more goods or services providers responding to a user request in accordance with an embodiment; and, FIG. 6 is a schematic diagram illustrating an example of a computing platform in accordance with an embodiment.

FIG. 5 depicts a flow chart of a process 500 relating to one or more responses from one or more goods or services providers to a user request in accordance with an embodiment.

With regard to box 502, one or more computing platforms may access one or more signals relating to one or more responses from one or more goods or services providers, such as one or more responses to a goods or services request from a user. For example, a goods or services provider may have received one or more messages relating to a user's goods or services request via one or more communication environments, such as described above. In this example, such goods or services providers may process the received request in any variety of manners, and may, under some circumstances, generate one or more responses to the requests. In this example, signals representing the generated one or more responses may be transmitted to a computing platform via one or more corresponding communication environments. Such transmitted signals may be received or accessed via one or more computing platforms for further processing, analysis, etc. It should, however, be noted that these are merely illustrative examples relating to signals representing one or more responses and that claimed subject matter is not limited in this regard.

With regard to box 504, one or more computing platforms may analyze such signals at least in part to determine a corresponding user. For example, user contact information may have been obfuscated relative to the one or more goods or services providers so that such goods or services providers may not have sufficient information to directly contact such a user. In this example, the responses from the one or more goods or services providers may be processed by one or more computing platforms. In this example, one or more portions of such responses may be processed using one or more of the techniques described above at least in part to determine one or more portions of the responses to include in one or more messages to the user.

In an embodiment, the one or more computing platforms may have one or more portions of user provided information to uniquely identify a particular user. For example, the one or more computing platforms may have access to stored account information relating to a user. For another example, the one or more computing platforms may have included a client identifier of some sort in the created messages transmitted to the one or more goods or services providers. For example, the one or more computing platforms may include an identifier in the created messages to allow the one or more computing platforms to looks up a user, such as an IP address, an e-mail address, a phone number, a text message or short message address, or the like. It should, however, be noted that these are merely illustrative examples relating to created messages and that claimed subject matter is not limited in this regard.

With regard to box 506, a computing platform may also determine one or more communication environments for such a user. For example, the computing platform may determine one or more user preferences, user account information, user provided information, or the like, relating to communication environments, such as a user selected preference for receiving communications via e-mail, voicemail, text messages, SMS messages, other message formats, or combinations thereof. In addition, the computing platform may analyze one or more portions of user provided information, such as a user textual narrative, user selection, or the like to determine a desirable communication environment to associate with the user. It should, however, be noted that these are merely illustrative examples relating to communication with a user and that claimed subject matter is not limited in this regard.

With regard to box 508, a computing platform may create one or more messages to such a user based at least in part on the signals representing one or more responses from the goods or services providers. In this example, the computing platform may create a message to a user via a determined communication environment comprising one or more portions of one or more responses from the goods or services providers. For example, such a created message may comprise information relating to the goods or services providers such as hourly rates, price quotes, estimates, scheduling information for an appointment, etc. In addition, such a created message may further comprise information relating to one or more of the goods or services providers, such as price comparisons, other user ratings of the goods or services providers, etc. In at least one embodiment, contact information for the one or more goods or services providers may be obfuscated from the user. For example, a user may be provided with one or more reply options that do not include direct contact information for the goods or services providers. In this manner further communication between the user and the goods or services providers may be conducted through one or more third party systems. Such third party systems may provide benefits or advantages such as tracking communication, tracking customer leads that may turn lead to business opportunities for the goods or services providers, etc. In at least one other embodiment, contact information for the goods or services providers may not be obfuscated, such that a user may be able to directly contact one or more of the goods or services providers. With regard to box 510, a computing platform may transmit one or more signals representing the created messages to the user via the one or more determined communication environments. In addition, processes, such as those described above, may be repeated as desired for additional communications between users and one or more goods or services providers. It should, however, be noted that these are merely illustrative examples relating to creating or transmitting messages and that claimed subject matter is not limited in this regard.

Figure 6:
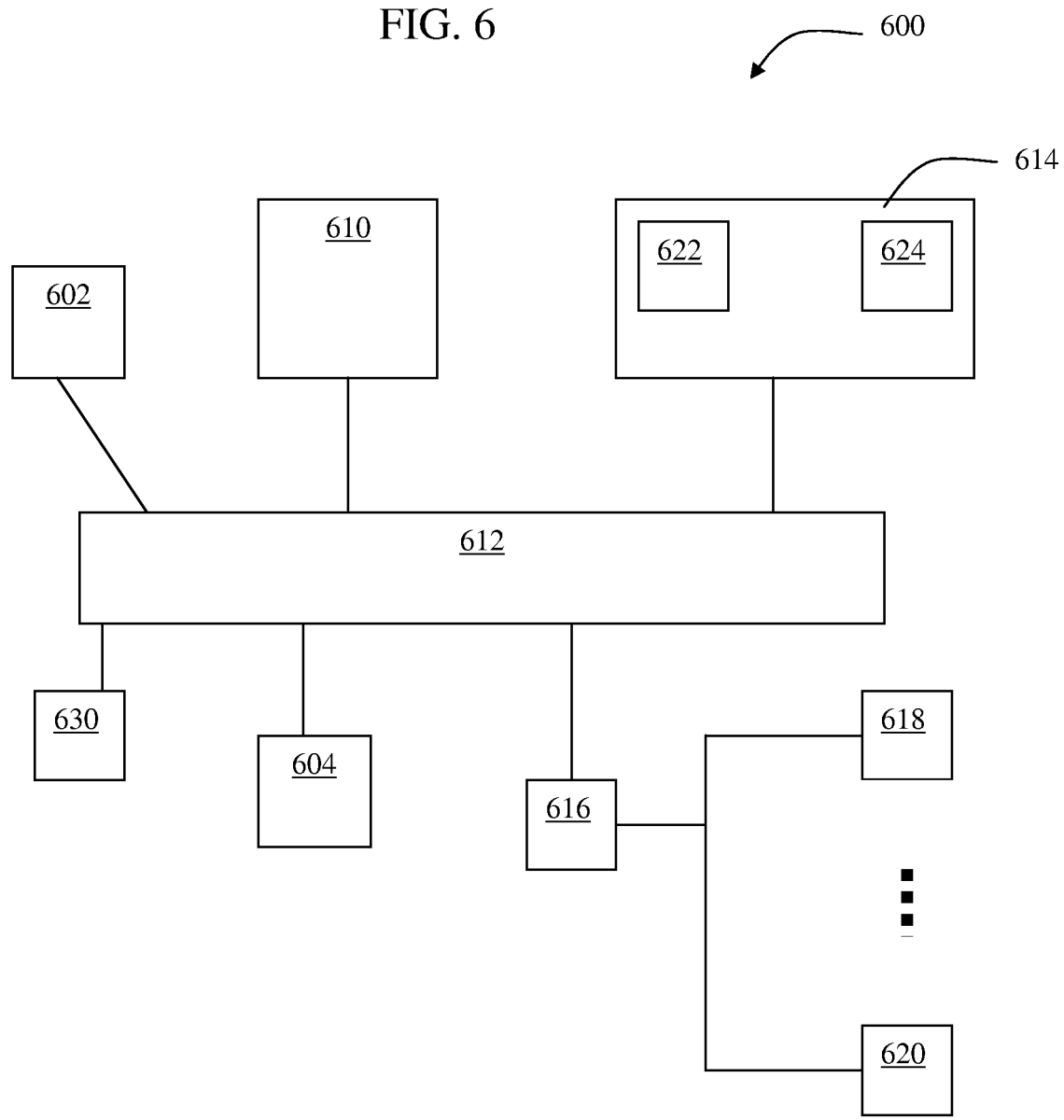

FIG. 6. a schematic diagram depicting an embodiment 600 of an apparatus for use in searching information, identifying one or more goods or services providers, determining one or more communication environments, creating one or more messages, transmitting one or more messages, or combinations thereof. Here, apparatus 600 may include a special purpose computing platform, such as a specific client device, and/or the like. Here, apparatus 600 depicts a special purpose computing platform that may include one or more processors, such as processor 610. Furthermore, apparatus 600 may include one or more memory devices, such as storage device 630, memory unit 604, or computer readable medium 602. In addition, apparatus 600 may include one or more network communication adapters, such as network communication adaptor 616. Apparatus 600 may also include a communication bus, such as communication bus 612, operable to allow one or more connected components to communicate under appropriate circumstances.

In an example embodiment, communication adapter 616 may be operable to receive or transmit signals relating to one or more portions of user provided information, one or more communication environments, one or more created messages, or combinations thereof, such as by communicating with network 410 in FIG. 4, for example. In addition, as non-limiting examples, communication adapter 616 may be operable to send or receive one or more binary digital signals representing one or more user's interactions, such as via a graphical user interface, with one or more selectable features associated with one or more portions of user provided information, as described previously.

In an example embodiment, processor 622 may be operable to perform one or more processes previously described, such as one or more processes depicted in FIG. 1, FIG. 3, or combinations thereof. In this context, a processor refers to a processor, or other like device, operable to identify one or more determine one or more communication environments, identify one or more goods or services providers, analyze one or more portions of user provided information, create one or more messages, transmit signals corresponding to the created one or more messages, or combinations thereof.

In certain embodiments, apparatus 600 may be operable to transmit or receive information relating to, or used by, one or more process or operations, such as one or more processes mentioned previously, via communication adapter 616, computer readable medium 602, have stored some or all of such information on storage device 604 or 630, for example. As an example, computer readable medium 602 may include some form of volatile and/or nonvolatile, removable/non-removable memory, such as an optical or magnetic disk drive, a digital versatile disk, magnetic tape, flash memory, and/or the like. In certain embodiments, computer readable medium 602 may have stored thereon computer-readable instructions, executable code, and/or other data which may enable a computing platform to perform one or more processes or operations mentioned previously.

In certain example embodiments, apparatus 600 may be operable to store information relating to, or used by, one or more operations mentioned previously, such as signals relating to a user's interaction with one or more selectable features associated with, or representative of, one or more goods or services providers in memory unit 622, storage device 624, or combinations thereof. It should, however, be noted that these are merely illustrative examples and that claimed subject matter is not limited in this regard. For example, information stored or processed, or operations performed, in apparatus 600 may be performed by other components or devices depicted or not depicted in FIG. 6. To illustrate, operations which may be performed by processor 622 may be performed by processor 614 in certain embodiments. Furthermore, operations performed by components or devices in apparatus 600 may be performed in distributed computing environments where one or more operations may be performed by remote processing devices which may be linked via a communication network.

In certain embodiments, apparatus 600 may represent a client computing platform. Here, as just an example, a user which may be using apparatus 600 may interact via a graphical user interface, such as a GUI on a display (not shown), or other interactive devices, such as a keyboard, to input a search query into a search field. In certain embodiments, a program or operation operating at least in part on apparatus 600, such as a desktop search application or other types of search applications, may perform a search and compile a set of search results. Such search results, or portions thereof, may be displayed to a user via a display, such as described previously, as just an example. Additionally and/or alternatively, network communication adaptor 616 may transmit binary digital signals representing a user's search query to another computing platform, such as a computing platform coupled to network 410 in FIG. 4, as just an example. In certain embodiments, processor 622 may access a plurality of search results obtained from a user's search, such as a plurality of search results compiled at least in part by apparatus 600, and/or a plurality of search results served at least in part to apparatus 600 by one or more computing platforms in system 400, as just an example. Processor 622 may transmit binary digital signals representing one or more portions of user provided information to one or more application programs running at least in part on apparatus 600 so that one or more goods or services providers may be displayed to a user, such as displayed on a display, as just an example. In addition, in certain embodiments, processor 622 may access or otherwise obtain binary digital signals representing one or more user's interactions with one or more selectable features associated with one or more goods or services providers. Such signals may be processed at least in part by processor 622, one or more other processors, or combinations thereof.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. The foregoing is not intended to be an exhaustive list of all examples in which a change in state for a binary one to a binary zero or vice-versa in a memory device may comprise a transformation, such as a physical transformation. Rather, the foregoing are intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

One advantage to a particular embodiment may be that it may be less time consuming or inefficient for a user to identify or communicate with one or more goods or services providers. For example, in a particular embodiment, a user may be able to transmit a message comprising user provided information to one or more communication environments associated with one or more goods or services providers.

Yet another advantage may be that, in a particular embodiment, identify or communicating with one or more goods or services providers may not expose a user's computing platform to pernicious programs, such as malware, spyware, or adware, as just some examples, or expose user information which the user may regard as private, such as information stored or accessible via a user's computing platform, to sources in which the user may not find desirable. Of course, these are merely example advantages of exemplary embodiments.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, features that would be understood by one of ordinary skill were omitted or simplified so as not to obscure claimed subject matter. While certain features have been illustrated or described herein, many modifications, substitutions, changes or equivalents will now occur to those skilled in the art. It is, therefore, to be understood that the appended claims are intended to cover all such modifications or changes as fall within the true spirit of claimed subject matter.

The invention claimed is:

1. A method comprising:
    accessing one or more electronic signals, wherein said electronic signals at least in part represent user provided information, wherein said user provided information relates at least in part to one or more goods or services;
    processing, using a processor, said one or more electronic signals at least in part to determine one or more goods or services providers;
    processing, using a processor, said one or more electronic signals at least in part to determine one or more communication environments associated with said one or more goods or services providers,
    generating, by modifying said one or more electronic signals, a plurality of messages each corresponding to a communication environment that enables the plurality of messages to be transmitted using a plurality of communication protocols associated with a plurality of communication environments to said one or more goods or services providers; and
    transmitting, using the communication environment individually corresponding to each of the generated plurality of messages, one or more electronic signals representing the generated plurality of messages to said one or more determined goods or services providers.

2. The method of claim 1, wherein said user provided information comprises one or more portions of textual information, one or more images, geographic information associated with said user, one or more user selected options, one or more portions of user account information, or combinations thereof.

3. The method of claim 1, wherein said processing one or more electronic signals at least in part to determine one or more goods or services providers comprises:
    analyzing said user provided information based, at least in part, on one or more natural language processing methods or one or more key words, wherein said one or more key words are associated, at least in part, with said one or more goods or services providers or one or more categories of goods or services providers.

4. The method of claim 1, wherein said processing one or more electronic signals at least in part to determine one or more communication environments associated with said one or more goods or services providers comprises:
    analyzing one or more information sources at least in part to determine one or more communication environments for said one or more goods or services providers.

5. The method of claim 4, wherein said one or more information sources comprises at least one or more network accessible documents or files, or one or more locally stored documents or files.

6. The method of claim 1, wherein said one or more communication environments comprises e-mail, telephone, cellular telephone, text messaging, short messaging services, other electronic communication techniques, or combinations thereof.

7. An apparatus comprising:
    a processor coupled to a memory;
    a computing platform operable to access one or more electronic signals relating to a user search via one or more search applications for one or more goods or services providers;
    said computing platform further operable to process said electronic signals to determine one or more communication environments associated with said one or more goods or services providers;
    said computing platform further operable to modify said one or more electronic signals to generate a plurality of messages each corresponding to a communication environment that enables the plurality of messages to be transmitted using a plurality of communication protocols associated with a plurality of communication environments to said one or more goods or services providers; and
    said computing platform further operable to transmit said plurality of messages to one or more goods or services providers using the communication environment individually corresponding to each of the generated plurality of messages.

8. The apparatus of claim 7, wherein said computing platform is further operable to process said electronic signals at least in part to determine one or more portions of user provided information to transmit to said one or more goods or services providers.

9. The apparatus of claim 8, wherein said computing platform is further operable to process said electronic signals at least in part with one or more language processing techniques.

10. The apparatus of claim 8, wherein said computing platform is further operable to provide a user interface at least in part for receiving said one or more portions of user provided information.

11. The apparatus of claim 7, wherein said computing platform is further operable to refine search results for said one or more goods or services providers based at least in part on one or more portions of user provided information.

12. The apparatus of claim 7, wherein said computing platform is further operable to receive one or more messages from said one or more goods or services providers at least in part relating to one or more of the transmitted plurality of messages.

13. The apparatus of claim 12, wherein said computing platform is further operable to determine one or more communication environments associated with said user and create generate one or more messages to said user based at least in part on said one or more received messages from one more goods or services providers and the determined one or more communication environments.

14. The apparatus of claim 12, wherein said computing platform is further operable to transmit one or more messages to said user based, at least in part, on the received one or more messages from said one or more goods or services providers.

15. A system comprising:
    a processor coupled to a memory;
    a computing platform operable to access one or more electronic signals, wherein said one or more electronic signals relate to a user search via one or more search applications for one or more goods or services providers;
    said computing platform further operable to transmit to a user's computing platform a plurality of search results comprising information relating to one or more goods or services providers;
    said computing platform further operable to process said electronic signals to determine one or more communication environments associated with said one or more goods or services providers;
    said computing platform further operable to modify said one or more electronic signals to generate a plurality of messages each corresponding to a communication environment that enables the plurality of messages to be transmitted using a plurality of communication protocols associated with a plurality of communication environments to said one or more goods or services providers; and said computing platform further operable to transmit one or more messages of said plurality of messages to one or more of said goods or services providers using the communication environment individually corresponding to each of the generated plurality of messages.

16. The system of claim 15, wherein said computing platform is further operable to refine said plurality of search results based at least in part on the electronic signals.

17. The system of claim 16, wherein said computing platform is further operable to process text associated with said user search at least in part by using one or more language processing techniques.

18. The system of claim 17, wherein said one or more language processing techniques comprise one or more natural language processing techniques or one or more key words processing techniques.

19. The system of claim 16, wherein said to refine said plurality of search results is based at least in part on a user's selection or deselection of one or more of said search results.

20. The system of claim 15, wherein at least a portion of said transmitted message at least in part obfuscates user provided information associated with said user search.

21. An apparatus comprising:
means for receiving one or more electronic signals, wherein said electronic signals comprise user provided information, wherein said user provided information relates at least in part to one or more goods or services;
means for processing said one or more electronic signals at least in part to determine one or more goods or services providers;
means for processing said one or more electronic signals at least in part to determine one or more communication environments associated with said one or more goods or services providers;
means for modifying said one or more electronic signals to generate a plurality of messages each corresponding to a communication environment that enables the plurality of messages to be transmitted using a plurality of communication protocols associated with a plurality of communication environments to said one or more goods or services providers; and
means for transmitting, using the communication environment individually corresponding to each of the generated plurality of messages, one or more electronic signals representing the generated one or more messages to the plurality of said one or more goods or services providers.

22. A method comprising:
accessing one or more electronic signals, wherein said electronic signals at least in part represents user provided information, wherein said user provided information relates at least in part to one or more goods or services;
processing, using a processor, said one or more electronic signals at least in part to determine one or more goods or services providers;
processing, using a processor, said one or more electronic signals at least in part to determine one or more communication environments associated with said one or more goods or services providers,
generating, by modifying said one or more electronic signals, a plurality of messages each corresponding to a communication environment that enables the plurality of messages to be transmitted using a plurality of communication protocols associated with a plurality of communication environments to said one or more goods or services providers;
transmitting, using the communication environment individually corresponding to each of the generated plurality of messages, one or more electronic signals representing the generated plurality of messages to said one or more determined goods or services providers;
receiving one or more messages from said one or more goods or services providers at least in part relating to one or more of the transmitted one or more generated messages; and
transmitting one or more messages to said user based, at least in part, on the received one or more messages from said one or more goods or services providers.

* * * * *